United States Patent
Childs et al.

(10) Patent No.: US 9,519,883 B2
(45) Date of Patent: Dec. 13, 2016

(54) AUTOMATIC PROJECT CONTENT SUGGESTION

(75) Inventors: Benjamin Edward Childs, Seattle, WA (US); Nicholas Caldwell, Bellevue, WA (US); Saliha Azzam, Redmond, WA (US); Courtney Anne O'Keefe, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/170,850

(22) Filed: Jun. 28, 2011

(65) Prior Publication Data

US 2013/0007036 A1 Jan. 3, 2013

(51) Int. Cl.
*G06F 17/30* (2006.01)
*G06Q 10/10* (2012.01)

(52) U.S. Cl.
CPC ......... *G06Q 10/10* (2013.01); *G06F 17/30997* (2013.01)

(58) Field of Classification Search
None
See application file for complete search history.

(56) References Cited

U.S. PATENT DOCUMENTS

| | | | |
|---|---|---|---|
| 6,553,358 B1 | 4/2003 | Horvitz | |
| 7,065,514 B2 | 6/2006 | Yang-Stephens et al. | |
| 7,219,148 B2 | 5/2007 | Rounthwaite et al. | |
| 7,275,089 B1 * | 9/2007 | Marshall et al. | 709/219 |
| 7,702,674 B2 | 4/2010 | Hyder et al. | |
| 7,734,627 B1 | 6/2010 | Tong | |
| 7,765,212 B2 | 7/2010 | Surendran et al. | |
| 7,783,645 B2 | 8/2010 | Hess | |
| 7,953,736 B2 | 5/2011 | Rinearson et al. | |
| 8,260,859 B2 | 9/2012 | Boyer et al. | |
| 8,301,837 B1 * | 10/2012 | Natarajan | 711/122 |
| 8,645,367 B1 * | 2/2014 | Hajaj et al. | 707/727 |
| 2002/0016800 A1 | 2/2002 | Spivak et al. | |

(Continued)

FOREIGN PATENT DOCUMENTS

| | | |
|---|---|---|
| CN | 101203847 A | 6/2008 |
| EP | 1 320 038 A2 | 6/2003 |

OTHER PUBLICATIONS iManage WorkPortal. Create Your Personalized Gateway to Enterprisewide Content. Retrieved Date: Oct. 4, 2010. http://www.wyodata.com/Files/imngWP.pdf. Pages 2.

(Continued)

*Primary Examiner* — Richard Bowen
(74) *Attorney, Agent, or Firm* — Dave Ream; Tom Wong; Micky Minhas (57) ABSTRACT

Automatically suggesting content, for example, documents, contacts information, tasks, calendar items, and the like, for inclusion into an electronic collaborative workspace is provided. Given a short description of a given project or collaborative workspace, an initial project membership list, and identification of local or external content repositories, content associated with the project or workspace may be retrieved and recommended to one or more users for inclusion into the project or collaborative workspace. Thus, the time and effort required for initially populating an electronic workspace with needed content is dramatically reduced.

20 Claims, 7 Drawing Sheets

(56) References Cited

U.S. PATENT DOCUMENTS

| | | | |
|---|---|---|---|
| 2003/0130993 | A1 | 7/2003 | Mendelevitch et al. |
| 2003/0135565 | A1* | 7/2003 | Estrada ........................ 709/206 |
| 2005/0060371 | A1 | 3/2005 | Cohen |
| 2005/0060643 | A1 | 3/2005 | Glass et al. |
| 2005/0160148 | A1 | 7/2005 | Yu |
| 2005/0262210 | A1 | 11/2005 | Yu |
| 2006/0090071 | A1 | 4/2006 | Sinzig |
| 2006/0212142 | A1 | 9/2006 | Madani et al. |
| 2008/0168140 | A1* | 7/2008 | Chen et al. ................... 709/205 |
| 2008/0172363 | A1 | 7/2008 | Wang et al. |
| 2008/0228774 | A1* | 9/2008 | Hamilton et al. .............. 707/10 |
| 2008/0229213 | A1* | 9/2008 | Hamilton et al. ............ 715/751 |
| 2009/0006415 | A1 | 1/2009 | McAniff et al. |
| 2009/0125977 | A1* | 5/2009 | Chander et al. .................. 726/1 |
| 2009/0198717 | A1 | 8/2009 | Warner et al. |
| 2009/0228555 | A1 | 9/2009 | Joviak |
| 2009/0234721 | A1* | 9/2009 | Bigelow et al. ................ 705/12 |
| 2009/0307598 | A1 | 12/2009 | Giles |
| 2010/0094818 | A1 | 4/2010 | Farrell et al. |
| 2010/0141902 | A1* | 6/2010 | Destain et al. ................. 353/69 |
| 2010/0153325 | A1 | 6/2010 | Amoroso et al. |
| 2010/0174747 | A1 | 7/2010 | Farrell et al. |
| 2010/0235367 | A1 | 9/2010 | Chitiveli |
| 2010/0318613 | A1 | 12/2010 | de Souza et al. |
| 2010/0325559 | A1* | 12/2010 | Westerinen et al. .......... 715/753 |
| 2010/0332428 | A1 | 12/2010 | McHenry et al. |
| 2011/0054968 | A1* | 3/2011 | Galaviz ........................ 705/7.28 |
| 2011/0066619 | A1 | 3/2011 | Perantatos et al. |
| 2011/0081083 | A1* | 4/2011 | Lee et al. ...................... 382/182 |
| 2011/0106835 | A1* | 5/2011 | Lauridsen et al. ............ 707/769 |
| 2011/0161168 | A1 | 6/2011 | Dubnicki |
| 2012/0072843 | A1* | 3/2012 | Durham et al. .............. 715/733 |
| 2013/0006986 | A1 | 1/2013 | Phan et al. |
| 2013/0007009 | A1 | 1/2013 | Caldwell et al. |

OTHER PUBLICATIONS

Chan, Swee-Lean et al. Prototype Web-based Construction Project Management System. Retrieved Date: Oct. 4, 2010. http://plaza.ufl.edu/nnleung/mspapers/prototype.pdf. pp. 31.

Farrell, S. et al., "Fringe Contacts: People-Tagging for the Enterprise," *IBM Research Report*, http://domino.watson.ibm.com/library/CyberDig.nsf/papers/53299B3OAD986C78852571B0004F46A9/$File/rj10384.pdf, 6 pages (Jun. 30, 2006).

Farrell, S. et al., "Socially Augmenting Employee Profiles with People-Tagging," *UIST '07*, http://tlau.org//research/papers/292-farrell.pdf, 10 pages (Oct. 7-10, 2007).

Implicit Mailroom™. "Email Categorization Tool for Microsoft® Outlook®." Retrieved on Oct. 4, 2010. http://www.sapphire.net/downloads/TitusforOWADatasheet.pdf. 2 pp.

Mailspect.com. Published Aug. 17, 2010. "Email Classification with Mailspect Email Stream Management." http://www.mailspect.com/2010/08/17/email-classification-with-mailspect-email-j stream-management/. 2 pp.

Muller, M., "Comparing Tagging Vocabularies among Four Enterprise Tag-Based Services," *Group '07*, http://domino.research.ibm.com/cambridge/research.nsf/0/6730bd759054966d852574b100605e23/$FILE/group171.pdf , 10 pages (Nov. 4-7, 2007).

Naurez et al., "Implicit Social Network Construction and Expert User Determination in Web Portals," AAAI Spring Symposium: Social Information Processing, pp. 60-65, Association for the Advancement of Artificial Intelligence (2008).

Sohan, S.M. et al., "Auto-tagging Emails with User Stories Using Project Context," http://people.ucalgary.ca/~smsohan/XP_2010_Email_Auto_Tagging_Sohan_Richter_Maurer.pdf pp. 1-14 (2010).

Stumpf, S., Rajaram, V., Li, L., Burnett, M., Dietterich, T., Sullivan, E., Drummond, R., and Herlocker, J. Oregon State University, School of Electrical Engineering and Computer Science. "Toward Harnessing User Feedback for Machine Learning." Published Jan. 28, 2007. http://citeseerx.ist.psu.edu/viewdoc/download;jessionid=C80687FF0786EC539FEE88294CBC5465?doi=10.1.1.1 29.2393& repl&type=pdf. 10 pp.

Titus Labs. "Message Classification™ for Microsoft Outlook Web Access." Retrieved on Oct. 4, 2010. 2 pp.

Xu et al., "A personalized researcher recommendation approach in academic contexts: Combining social networks and semantic concepts analysis," PACIS 2010 Proceedings, Paper 144, AIS Electronic Library (2010).

Culotta et al., "Title Extracting social networks and contact information from email and the Web", Computer Science Department Faculty Publication Series, Paper 33, University of Massachusetts, 2004.

Lin et al., "SmallBlue: People Mining for Expertise Search", Multimedia at Work, vol. 15, Issue 1, pp. 78-84, IEEE, 2008.

Lin et al., "SmallBlue: Social Network Analysis for Expertise Search and Collective Intelligence", IEEE 25th International Conference on Data Engineering 2009, pp. 1483-1486, IEEE, 2009.

Rivera-Pelayo et al., "Building Expert Recommenders from Email-Based Personal Social Networks", The Influence of W Technology on Social Network Analysis and Mining, Lecture Notes in Social Networks vol. 6, pp. 129-156, Springer-Verlag Wien, 2013.

Zhang et al., "Searching for expertise in social networks: a simulation of potential strategies", Group '05 Proceedings of the 2005 international ACM SIGGROUP conference on Supporting group work, pp. 71-80, ACM, 2005.

Gores et al., "Ein erwartungsgesteuerter Koordinator zur partiellen Textanalyse," DFKI Documents, 62 pages (May 1, 1993).

Hayes et al., "TCS: A Shell for Content-Based Text Categorization," 6th Conference on Artificial Intelligence Applications, pp. 320-326 (May 1990).

Mock, Kenrick, "An Experimental Framework for Email Categorization and Management", In Proceedings of the 24th Annual International ACM SIGIR Conference on Research and Development in Information Retrieval, Sep. 12, 2001, 3 Pages.

Peng, Ren L, "Research of Chinese Page Automatic Classification Based on Representive Samples", In Master's Thesis Submitted on Information Science and Technology, Shandong University, Sep. 2010, 61 Pages.

Whittaker, et al., "Large-Scale Automatic Classification of Phishing Pages", In NDSS, vol. 10, Mar. 2010, 14 Pages.

Zhang, et al., "An Automatic Knowledge Database-based Email Classification System", In Journal of Huaihai Institute of Technology, vol. 13, Issue 2, Jun. 30, 2004, pp. 29-32.

"Chinese Doctoral Dissertions and Masters Theses Full-text Database", In Doctoral Dissertions Submitted on Information Science and Technology, Shandong University, Jun. 20, 2004, 65 Pages.

\* cited by examiner

AUTOMATIC PROJECT CONTENT SUGGESTION

BACKGROUND

With the advent of modern distributive computing networks and systems, shared collaborative workspaces have become commonplace. A common problem with such shared collaborative workspaces is that a given user must perform the initial task of creating a workspace, inviting participants to join in the collaborative workspace, and gathering together related documents and/or resources that belong in or that will be utilized within the workspace. Such initial work of creating and initiating a given workspace is often tedious enough to prevent the adoption of the shared collaborative workspace altogether. Thus, members of a given business, social or academic enterprise, or users across one or more disparate enterprises may not enjoy the benefits of working together in the shared collaborative electronic workspace.

It is with respect to these and other considerations that the present invention has been made.

SUMMARY

Embodiments of the present invention solve the above and other problems by automatically suggesting content, for example, documents, contacts information, tasks, calendar items, and the like, for inclusion into an electronic collaborative workspace. Given a short description of a given project or collaborative work event, an initial project membership list, and identification of local or external content repositories, content associated with the project or workspace may be retrieved and recommended to one or more users for inclusion into the project or collaborative workspace. Thus, the time and effort required for initially populating an electronic workspace with needed content is dramatically reduced.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

As briefly described above, embodiments of the present invention are directed to automatically suggesting content, for example, documents, contacts information, tasks, calendar items, and the like, for inclusion into an electronic collaborative workspace is provided. Given a short description of a given project or collaborative workspace, an initial project membership list, and identification of local or external content repositories, content associated with the project or workspace may be retrieved and recommended to one or more users for inclusion into the project or collaborative workspace.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
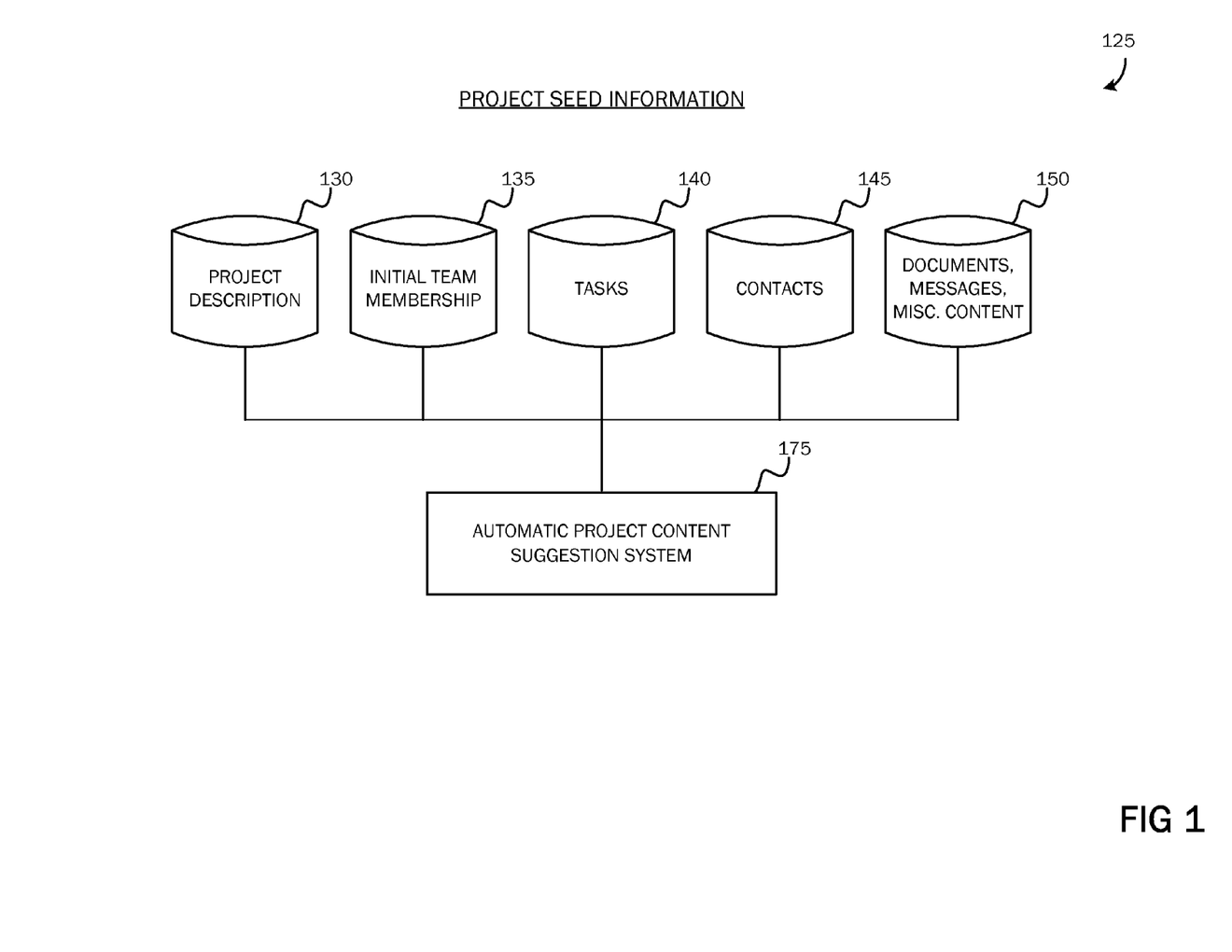
FIG. 1 is a simplified block diagram illustrating a number of content repositories from which content may be retrieved and analyzed for suggested inclusion in a given electronic project workspace.

FIG. 1 is a simplified block diagram illustrating a number of content repositories from which content may be retrieved and analyzed for suggested inclusion in a given electronic project workspace. According to embodiments, the initial task of creating a shared workspace, for example, a workspace associated with a given project team or project group, or the ongoing task of maintaining such a workspace includes gathering together documents and resources that should be associated together and assembled for the workspace and learning the identities, includes inviting those participants who should belong to or otherwise be associated with the workspace, and includes maintaining all the aforementioned information and contacts.

As illustrated in FIG. 1, a variety of project or workspace seed information is illustrated from which information needed for initially building and subsequently maintaining a shared workspace may be gathered. According to embodiments, a user may build or add to content in or associated with a given project workspace by identifying to the automatic project content suggestion system an initial project workspace, an initial workspace membership, one or more data repositories at which content may be searched and retrieved or linked to for inclusion in identified project workspace, or combinations thereof.

A project description store 130 is illustrative of a database of various project descriptions that may be associated with various existing or planned project workspaces. For example, for a given organization ten different project workspaces may have been developed, and descriptions for each of the ten project workspaces may be stored in the project description database 130. Similarly, various projects planned or ongoing in an organization may have descriptions that are stored in the project description database 130 that may be useful in determining all information such as documents, tasks, calendar items, contacts lists and the like that should be included in and maintained in a shared workspace. According to embodiments, the user may select an initial project workspace from the store 130, or the user may manually enter an identification of a new project workspace.

The initial team membership repository 135 is illustrative of a listing of various users that may be associated with a new project workspace for which information such as documents, electronic communications and the like may be gathered for assembly into or for maintenance of the project workspace. The tasks repository 140 is illustrative of one or more task lists associated with those users who will be added to a newly created project workspace or who will be added to an ongoing project workspace. The tasks repository 140 may also include tasks stored in a general task list associated with the project workspace and not associated with a particular user associated with the workspace.

The contacts repository 145 may include contacts information associated with the initial or ongoing members of the project workspace and may also include contacts information of users not members of the workspace but who are associated with the workspace through other information such as shared documents, electronic communications and the like. Contacts information 145 may be useful for subsequently adding additional users to the project workspace as the project workspace is being maintained. The documents, messages, and miscellaneous content repository 150 is illustrative of various sources of content including text content and metadata content associated with various documents, electronic communications and other resources that may be suggested for association with, storage with, maintenance with, and sharing with a newly created or maintained shared workspace, as described below.

As will be described with reference to FIG. 2A, information contained in all these various sources may be extracted by an automatic project content suggestion system 175, and links to each suggested piece of content, data or other resource may be generated. According to embodiments, the automatic project content suggestion system 175 may be a software application comprised of one or more software application modules operative to extract and search links associated with received project seed information and to present and process approved links followed by storage of links into a shared workspace, as described below with respect to FIG. 2A. If such links are approved by a user creating or maintaining the shared workspace, then such linked information may be assembled together and/or maintained in a shared workspace associated with a given project. For example, if a decision has been made in a company or other organization to start a project that will design a software application for assembling and reporting international sales data, a user charged with creating and maintaining a workspace of users, user contact information, documents related to the project, and all other resources needed for performing the duties of the project may assemble all the required resources together into a shared workspace, as described herein.

Figure 2A:
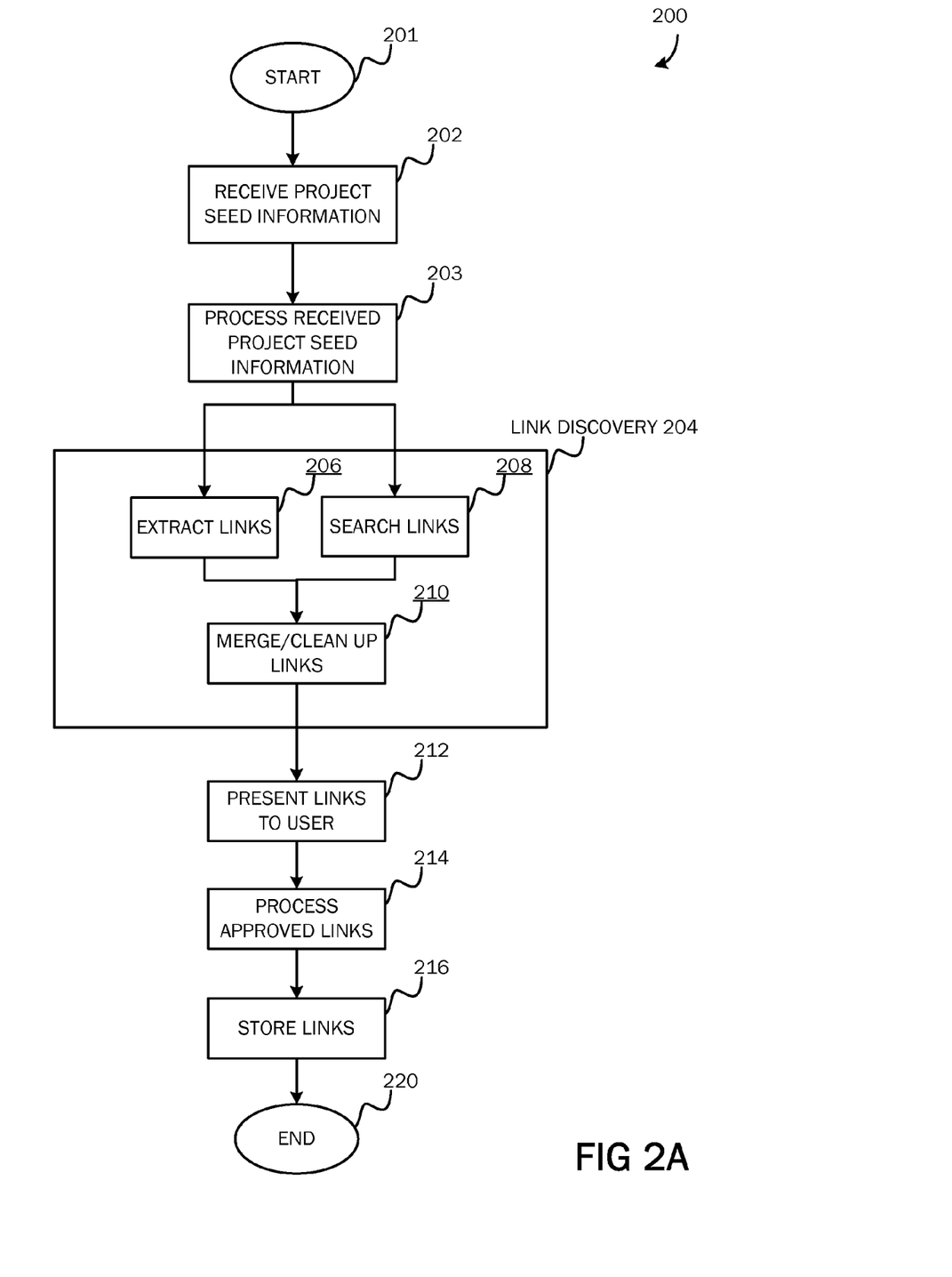
FIG. 2A illustrates a system architecture and process flow for automatically suggesting electronic content for inclusion in an electronic project workspace.

FIG. 2A illustrates a system architecture and process flow for automatically suggesting electronic content for inclusion in an electronic project workspace. A routine 200 begins at start operation 201 and proceeds to operation 202 where project seed information, as described above with reference to FIG. 1, is received for analysis and for association with a newly created or maintained project workspace. According to one embodiment, a single piece of content for example, a single document, a single content item, a single task item, a single project description, and the like may be provided to the automatic project content suggestion system at operation 202, or the locations of stores of information, for example, the information repositories, illustrated above in FIG. 1, may be provided to the content suggestion system 175 for pulling large amounts of content together for analysis and for suggesting links to content items and other resources that should or may be joined together in a shared project workspace. For example, at operation 202, an initial offering of a project description, documents, electronic mail messages, contacts items, proposed membership users, task items, calendar items, or combinations thereof may be provided to the automatic project content system 175.

At operation 203, the received content is processed for analysis by the content suggestion system 175 such that the content received may be broken into text components and associated metadata for determining whether each received content or resource item should be joined to a particular shared workspace. Received text content and metadata are analyzed and formatted as necessary for text processing as described below. According to embodiments, the text content and metadata analysis may be performed by a text parser operative to parse text content and metadata for processing the text into one or more text components (e.g., sentences and terms comprising the one or more sentences). For example, if the text content and metadata are formatted according to a structured data language, for example, Extensible Markup Language (XML), the text content and metadata analysis may include parsing the retrieved text content and metadata according to the associated structured data language for processing the text as described herein. For another example, the text content and metadata may be retrieved from an online source such as an Internet-based chat forum where the retrieved text may be formatted according to a formatting such as Hypertext Markup Language (HTML). According to embodiments, the text content and metadata analysis may be include formatting the retrieved text content and metadata from such a source so that it may be processed for conversation topics as described herein.

A text processing application may be employed whereby the text is broken into one or more text components for determining whether the received/retrieved text may contain terms (e.g., keywords) that may be used in determining whether associated content (e.g., documents, contacts, communications items, etc.) should be suggested for inclusion in a given project or other collaborative workspace. Breaking the text into the one or more text components may include breaking the text into individual sentences followed by breaking the individual sentences into individual tokens, for example, words, numeric strings, etc.

Such text processing is well known to those skilled in the art and may include breaking text portions into individual sentences and individual tokens according to known parameters. For example, punctuation marks and capitalization contained in a text portion may be utilized for determining the beginning and ending of a sentence. Spaces contained between portions of text may be utilized for determining breaks between individual tokens, for example, individual words, contained in individual sentences. Alphanumeric strings following known patterns, for example, five digit numbers associated with zip codes, may be utilized for identifying portions of text. In addition, initially identified sentences or sentence tokens may be passed to one or more recognizer programs for comparing initially identified sentences or tokens against databases of known sentences or tokens for further determining individual sentences or tokens. For example, a word contained in a given sentence may be passed to a database to determine whether the word is a person's name, the name of a city, the name of a company, or whether a particular token is a recognized acronym, trade name, or the like. As should be appreciated, a variety of means may be employed for comparing sentences or tokens of sentences against known, words, or other alphanumeric strings for further identifying those text items.

At operation/component 204, processed content, resources, and associated metadata are next passed to a link discovery module operated by the project content suggestion system 175. The link discovery module processes the received and processed content, resources and associated metadata for establishing links that may be suggested to a user responsible for creating or maintaining the shared workspace. According to embodiments, the link discovery system or module may be comprised of one or more components including link extraction, link searching, and link ranking.

At operation 206, the link extraction module examines the processed content, resources and associated metadata of all the content or resources input into the system to find links stored directly within the content. For example, a document may contain links to other documents. For example, a document may contain a URL (uniform resource locator) link in the document to another document or other piece of content or resource, for example, an Internet-based web site. Other links may be found in a given piece of content or resource for example, the citation of a contact in a document, the listing of associated users, the insertion of content or resources from other documents, for example, a spreadsheet application component embedded in a word processing document, and the like. Important metadata associated with the received content and/or resources may include information about the authors of the documents or other resources, senders of electronic communications, recipients of electronic communications, attendees of calendar items, for example, accepted meeting requests, contact information, for example, name, address, telephone number, and the like.

At operation 208, a link searcher module of the link discovery module/operation 204 uses keywords and metadata extracted from the received content and other resources during the processing operation 203 to search for external documents that may be associated with a particular content or resource item being analyzed. For example, keywords or other metadata extracted from a given document or resource may be used by the link searcher module to search various repositories, for example, the repositories illustrated above in FIG. 1 via Internet-based searches, intranet-based searches, searches of a local computing device, searches of networked computing devices, or searches of any local or remote repository to which the link discovery module is directed by the user preparing the project workspace. In addition, a repository, such as the repositories illustrated and described above with reference to FIG. 1, may include and may be updated with a variety of memory storage locations that should be searched each time a project workspace is being developed or maintained, as described herein.

As a result of the link searching operation 208, documents and other resources, for example, contacts information, electronic communications information, and the like not specifically considered as initial association with the project workspace may be found from local and remote storage areas for suggestion as part of the newly created or maintained shared project workspace. At operation 210, links associated with received content and extracted from received content and resources via the link extraction operation 206 and links found from other content and resources from various local and remote storage areas via the link searching operation 208 are merged together at the link merging operation 210.

During the link merging operation 210, a general organization and clean up of the merged links is performed. For example, duplicate links may be discarded, and links to information no longer relevant may be discarded. For example, a link to contact information of a person no longer employed with the company or organization who may not be joined into the planned or maintained project workspace may be discarded, and the like. In addition, a ranking of merged links may be performed wherein most important links are arranged at the top of a listing of links that will be presented to the user for approval. For example, links to users who will be suggested for initial membership or who are suggested for adding to the membership of a project workspace may be linked first, followed by links to documents and other resources associated with those users or found in other local and remote storage areas may be listed next, and so on.

At operation 212, the extracted, located, and merged links to content and to human and material resources that may be added to a newly created project workspace, or that may be added to an ongoing project workspace are presented to a user to allow the user to accept, correct, or replace suggested links for addition to the newly created or maintained project workspace. According to one embodiment, this information may be presented to the user for user feedback via a user interface component, described below with respect to FIG. 2B.

At operation 214, approved, corrected, or replaced links may be received from the reviewing user. If the user has accepted suggested links, the suggested links may be stored at operation 216. Any corrected or replaced links may be passed back to the link discovery module at operation 204 for further analysis in association with other content and resources analyzed for association with the subject project workspace. As should be appreciated, accepted links may likewise be passed back to the link discovery module to allow the link discovery module to learn from the approved links by either confirming the information it extracted or found through searching, or by analyzing the approved links by comparing the content and metadata to other content and resources that were not suggested to the user. After all such links are approved, approved links are stored in the newly created or maintained project workspace to allow subsequent users and/or members of the project workspace to utilize a collection of content and resources associated with the subject project that are necessary for performing the duties of the subject project.

Figure 2B:
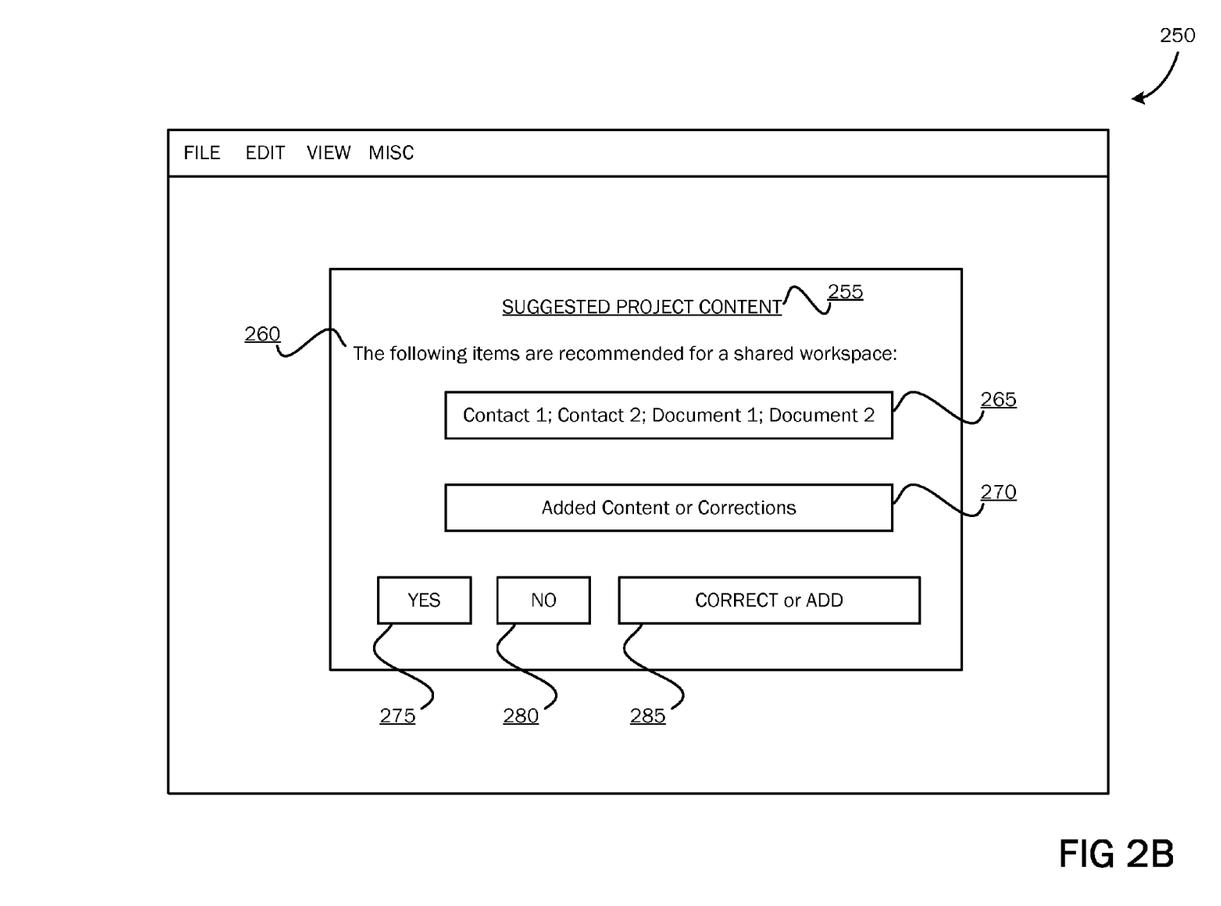
FIG. 2B illustrates a computer screen shot showing a user interface for receiving user feedback on suggested project workspace content.

As described above with reference to FIG. 2A, after a list of links are extracted or searched in association with received project seed information, suggested links are provided to a user who is responsible for building the initial project workspace, or otherwise maintaining the project workspace. FIG. 2B illustrates a computer screen shot showing a user interface for receiving user feedback on suggested project workspace content. The user interface component 250 is illustrative of any computer-generated user interface component in which suggested project workspace link information may be provided to a user for receiving user feedback. That is, the user interface component 250 may be presented to a user on any number of computing devices operative to present a visual user interface, as illustrated in FIG. 2B.

User interface component 250 includes a project content suggestion interface 255. A statement 260 such as "The following items are recommended for a shared workspace:" may be provided for indicating to the receiving user the nature of the user interface information. As should be appreciated, an identification of a particular project workspace may be identified to a user, to inform the user as to the particular project workspace to which the suggested content may be associated. A text box or field 265 is illustrated showing links to a variety of content and/or resources suggested by the automatic project content suggestion system 175. For example, the text box 265 shows a variety of contacts and documents that are initially suggested to the user for associating with the newly created or maintained project workspace.

If desired, the user may accept the suggested links, and the accepted suggested links will be passed back to the system 175 for processing, as described above. Alternatively, the user may revise, edit, or otherwise amend link information provided in the text box 265 for correcting information suggested to the user by the system 175. Submission of the corrected information back to the system 175 by the user may be processed for teaching the system 175, and for ultimately receiving new or improved link suggestions from the system 175.

In addition, a text box 270 is provided to allow the user to manually enter additional links to additional content and other resources not initially suggested by the content suggestion system 175. If the user enters new or replacement links into the text box 270 and submits the new or replacement links back to the content suggestion system 175, those submitted links may be automatically stored with the project workspace, or those links may be passed back to the link discovery module at operation 204 for use in refining the suggested links provided by the system 175 to the user.

As briefly described above, within any particular project workspace many users may be involved in the project workspace at any given time including numerous documents, electronic communications, contacts items, calendar items, and the like. A particular difficulty is associated with tracking the many different people associated with a given project any given time, particularly when some people/users enter and exit projects at various times in association with individual pieces of work product being performed for the given project and being associated with the project workspace. As illustrated below with respect to FIGS. 3A and 3B, an additional mechanism for finding, tracking, and suggesting contact information for various users associated with workspace is described. That is, the operations and user interface components described below with respect to 3A and 3B may be used to supplement suggested contact information obtained via the mechanisms described above with respect to FIGS. 2A and 2B, or may be used as an alternative mechanism for obtaining, suggesting and associating contacts information for various users with a given project workspace.

Figure 3A:
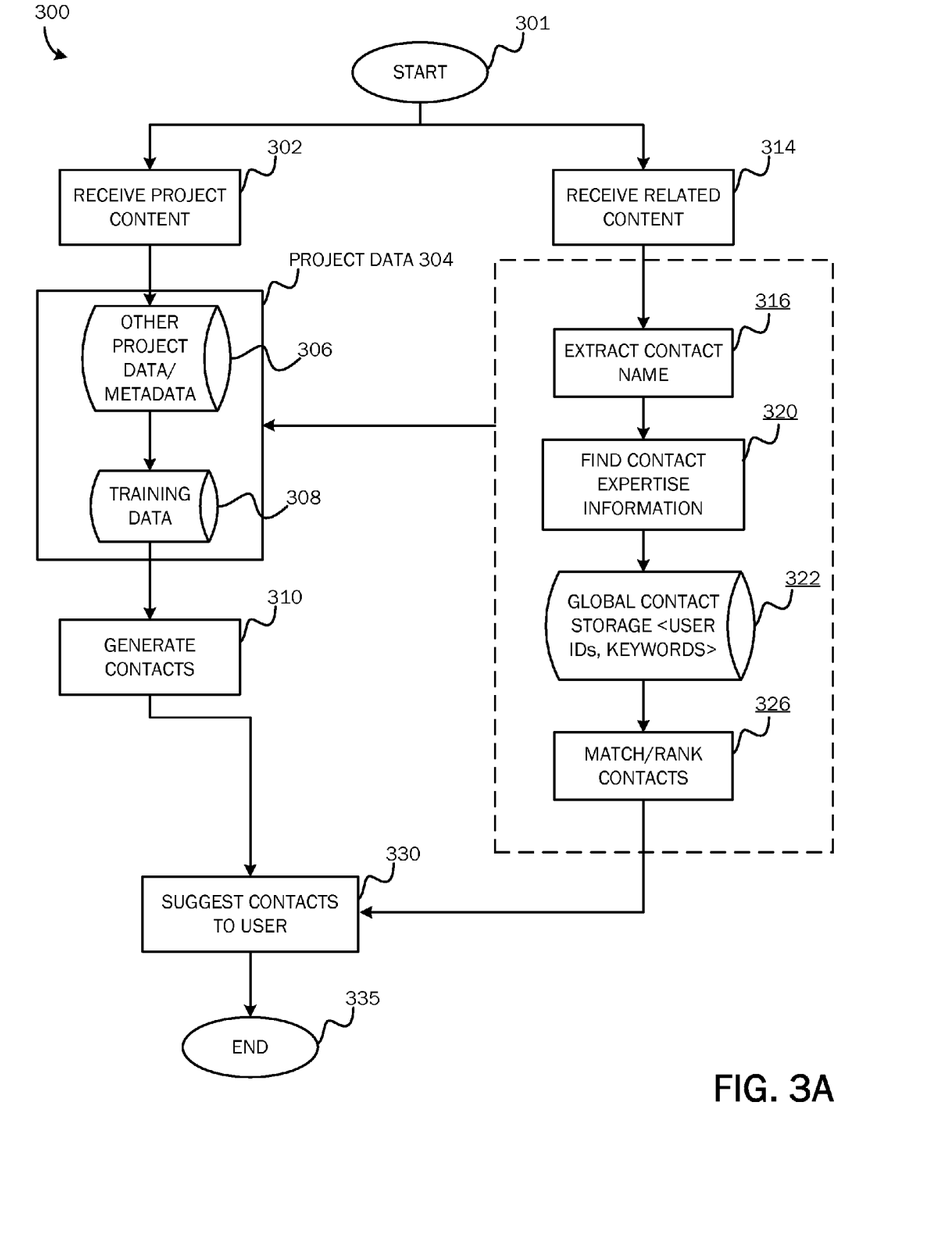
FIG. 3A illustrates a system architecture and process flow for automatically suggesting electronic contacts information for inclusion in an electronic project workspace.

FIG. 3A illustrates a system architecture and process flow for automatically suggesting electronic contacts information for inclusion in an electronic project workspace. The contacts suggestion system and method illustrated in FIG. 3A provides for contacts suggestion and maintenance via two analysis paths. A first analysis path includes mining project workspace content for additional contact information, and a second analysis path includes extracting contacts information that may relate to a subject project workspace through activities of users associated with the project workspace.

Referring to FIG. 3A, the method 300, which may be performed by the automatic project content suggestion system 175, begins at start operation 301 and proceeds to operation 302 where project content presently associated with the project workspace is mined for data associated with additional contacts that may be suggested for membership or other association with the project workspace. Content received at operation 302 may include documents, electronic communications, calendar items, task items, and the like. For each such received content that has not been processed into individual words and associated metadata, as described above with respect to FIG. 2A, such received content, for example, new documents is processed for extracting keywords, features, and other metadata associated with the new content. Keyword features and associated metadata may include such information as identification of authors of documents, identification of senders and recipients of electronic mail and text messaging or other electronic communications, task list authors, calendar item attendees, and the like.

At operations 306 and 308, the extracted keywords, features, and associated metadata are compared against corresponding information already contained in or associated with the subject project workspace. Duplicate or irrelevant information may be discarded, for example, if an author of a newly entered document is already identified as a contact in the present project workspace, the duplicate identification may be discarded. Once identifications for one or more persons/users are accomplished, those identifications may be compared against various databases of contact information accessible via local or remote storage media. For example, a company contacts database, a local contacts database, or external databases not associated with the user or the user's organization may be searched for comparing against identifications obtained from the received content.

Any identifications that do not match contact information at any searched contact information repository may be discarded or may be set aside for future analysis on a periodic basis. For example, if any individual user is identified but does not match with any available contact information, the identification of that user may be set aside, and if that user eventually is identified on a contacts list of a searched contacts repository, that contact subsequently may be suggested for inclusion in the project workspace.

Once a list of suggested contacts has been assembled, a ranking of suggested contacts may be performed where contacts considered of little relevance to the project may be discarded. For example, if contact information for a user who has only minor connections with the project, for example, a user who delivered a content item to a related user but had no other involvement in the project, may be discarded or ranked lower relative to other potential suggested contacts. At operation 310, the list of contacts that will be suggested to the user, as described below, is assembled.

Referring still to FIG. 3A, the second analysis path is described. At operation 314, content items and other resources that are related to the activities of users presently associated with the project workspace may be received for determining whether additional contacts information may be suggested for the project workspace. For example, documents generated, electronic communications conducted, and the like by users who are presently associated with the project workspace may be received for determining whether contacts information may be identified in such user activities that may be suggested for inclusion in the shared project workspace.

At operation 316, a contact name extraction may be performed. For example, metadata associated with content and other resources utilized by users belonging to the project workspace may be searched for such items as senders and receivers of electronic mail items, authors of documents, identifications of user names in text content, and the like for potential suggestion as new contacts for the project workspace. At operation 320, an expertise finding operation is performed whereby information about users identified at operation 316 is assembled. According to embodiments, the expertise finder may search a database repository 322 or other suitable database for that information. That is, names of persons/users identified at operation 316 may be compared against databases of contact information for obtaining other useful information about those identified persons/users including expertise information, information associated with other project workspaces those persons/users are associated with, and the like.

At operation 326, identifications of one or more users that may be suggested for membership in the present project workspace in the form of keywords, terms, or metadata associated with those potentially suggested users may be matched against keywords, terms and metadata associated with the present project workspace for determining those potentially suggested contacts that are most closely aligned with activities of the present project workspace. For example, if contact information for a particular user includes keywords, terms, or other metadata (e.g., expertise information) that matches similar information in the present project workspace, then that contact may serve as a strong candidate for inclusion in the project workspace. On the other hand, if keywords, terms, or other metadata identifying a potential contact for inclusion in the project workspace matched little or no similar data in the present project workspace, that candidate may be discarded or set aside for future analysis.

After a list of potentially suggested contacts is assembled at operation 326, the list may be passed back to the project data/metadata and training data at operations 306 and 308 for further analysis, as described above with respect to contact information received at operation 302. Otherwise, the list of potentially suggested contacts may be merged with suggested contacts assembled at operation 310 and may be suggested to a user responsible for creating and/or maintaining the project workspace at operation 330. As will be described below with respect to FIG. 3B, the user responsible for creating and/or maintaining the project workspace may accept, reject, correct, or add to suggested contact information, and any contact information submitted by the user responsible for creating or maintaining the workspace may then be added to the contacts list for the subject project workspace. The method ends at operation 335.

Figure 3B:
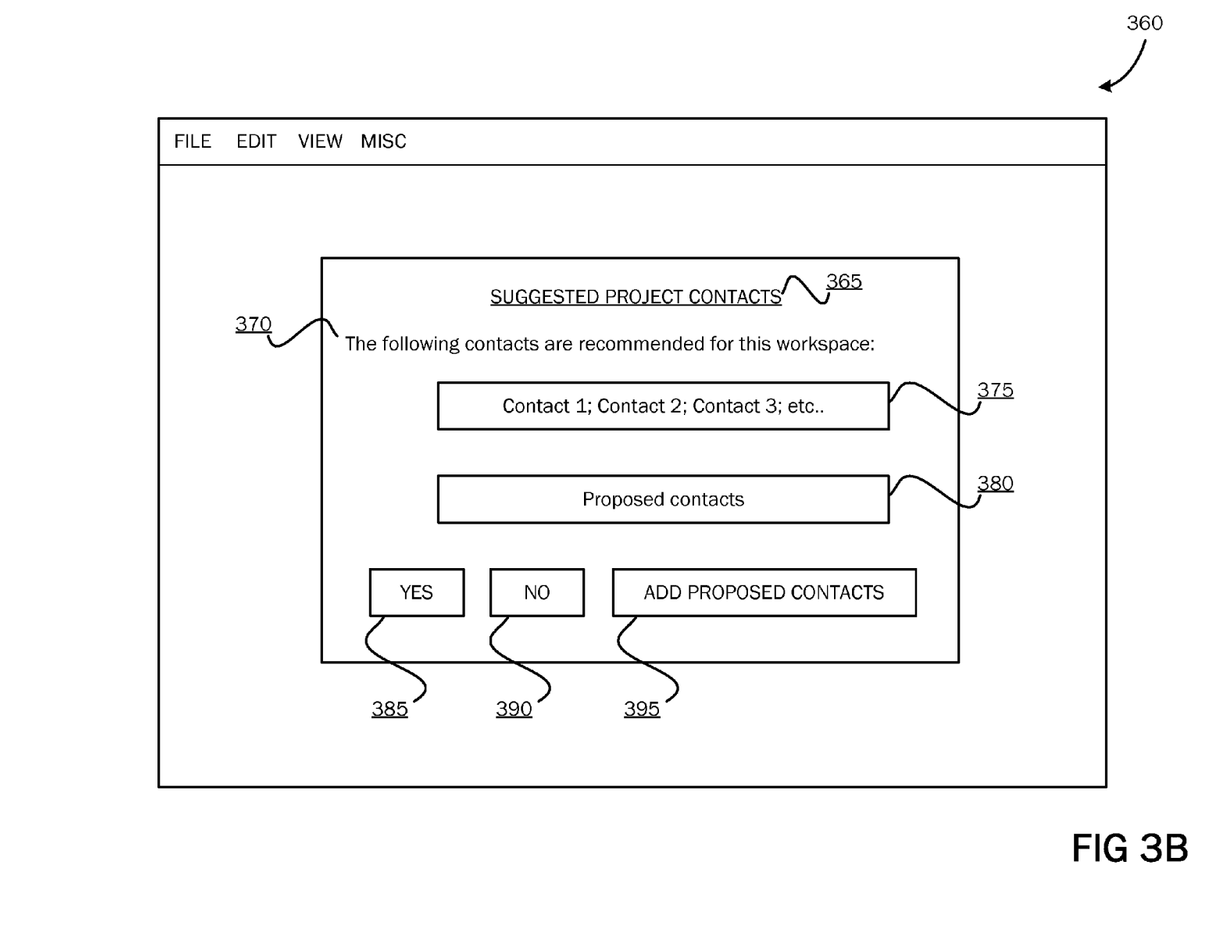
FIG. 3B illustrates a computer screen shot showing a user interface for receiving user feedback on suggested contacts information for a project workspace.

FIG. 3B illustrates a computer screen shot showing a user interface for receiving user feedback on suggested contacts information for a project workspace. The user interface 360, like the user Interface 250 described above, is illustrative of any suitable user interface component in which suggested contacts information may be provided to a user for acceptance, rejection, correction, or other modification. As should be appreciated, the user interface components described herein including the placement, orientation, or other display of user interface components are for purposes of illustration and example only and are not limiting of the vast numbers of user interface layouts and orientations that may be generated for performing the functionality described herein.

Referring still to FIG. 3B, the user interface component 360 includes a suggested project contact list interface 365. An identification statement 370 such as "The following candidates are suggested for this workspace:" is provided for identifying the user interface component to the receiving user. A text box or field 375 is provided in which suggested contacts may be displayed to the receiving and reviewing user. A proposed contacts text box or field 380 is provided in which the user may propose new contacts not suggested for the user, as described above. In addition, the user may make inline corrections to suggested contacts or to the proposed contacts displayed and/or entered in either of the text boxes/fields 375, 380. According to embodiments, accepted, rejected or replacement contacts submitted by the user may be passed back to the project workspace for storage in association with other contacts information stored with the project workspace. Contacts items rejected by the user may be either discarded altogether, or may be maintained for future analysis as more information associated with those rejected contact items comes available.

Figure 4:
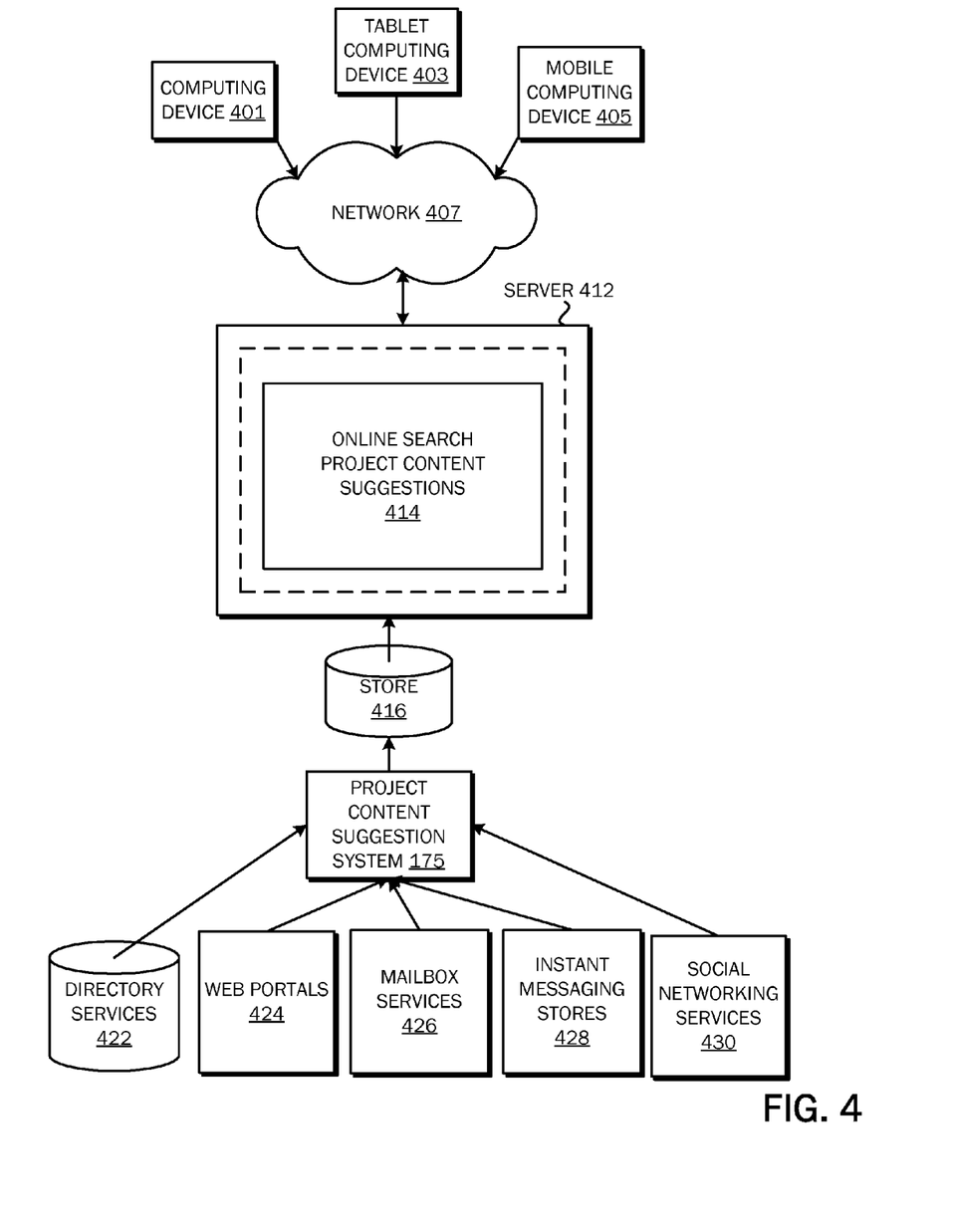
FIG. 4 illustrates a system architecture and process flow associated with utilizing suggested content, resources and associated metadata.

FIG. 4 illustrates a system architecture for providing suggested project workspace content and resources various client devices after generation as described above. As described previously, an automatic project content suggestion system 175 may be utilized for suggesting content of various types for inclusion in or association with one or more project workspaces received via a variety of communication channels and stores. Information and features helpful in suggesting content, resources items for one or more project workspaces may also be stored in different communication channels or other storage types. For example, received and suggested content, resources items and associated metadata or feature information may be stored using directory services 422, web portals 424, mailbox services 426, instant messaging stores 428 and social networking sites 430. The system 175 may use any of these types of systems or the like to store suggested content, resources items and associated metadata in a suggested content store 416. A server 412 may provide suggested content, resources items and associated metadata to various clients. As one example, server 412 may be a web server providing suggested content, resources items and associated metadata over the web. Server 412 may provide online content suggested content, resources items and associated metadata over the web to clients through a network 407. Examples of clients that may obtain suggested content, resources and associated metadata include computing device 401, which may include any general purpose personal computer, a tablet computing device 403 and/or mobile computing device 405 which may include smart phones. Any of these devices may obtain the suggested content, resources and associated metadata from the store 416.

As described above, embodiments of the invention may be implemented via local and remote computing and data storage systems, including the systems illustrated and described with reference to FIGS. 1-4. Consistent with embodiments of the invention, the aforementioned memory storage and processing unit may be implemented in a computing device, such as computing device 500 of FIG. 5. According to embodiments, the computing device may be in the form of a personal computer, server computer, handheld computer, smart phone, tablet or slate device, or any other device capable of containing and operating the computing components and functionality described herein. In addition, the computing device components described below may operate as a computing system printed on a programmable chip. Any suitable combination of hardware, software, or firmware may be used to implement the memory storage and processing unit. For example, the memory storage and processing unit may be implemented with computing device 500 or any other computing devices 518, in combination with computing device 500, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with embodiments of the invention.

Figure 5:
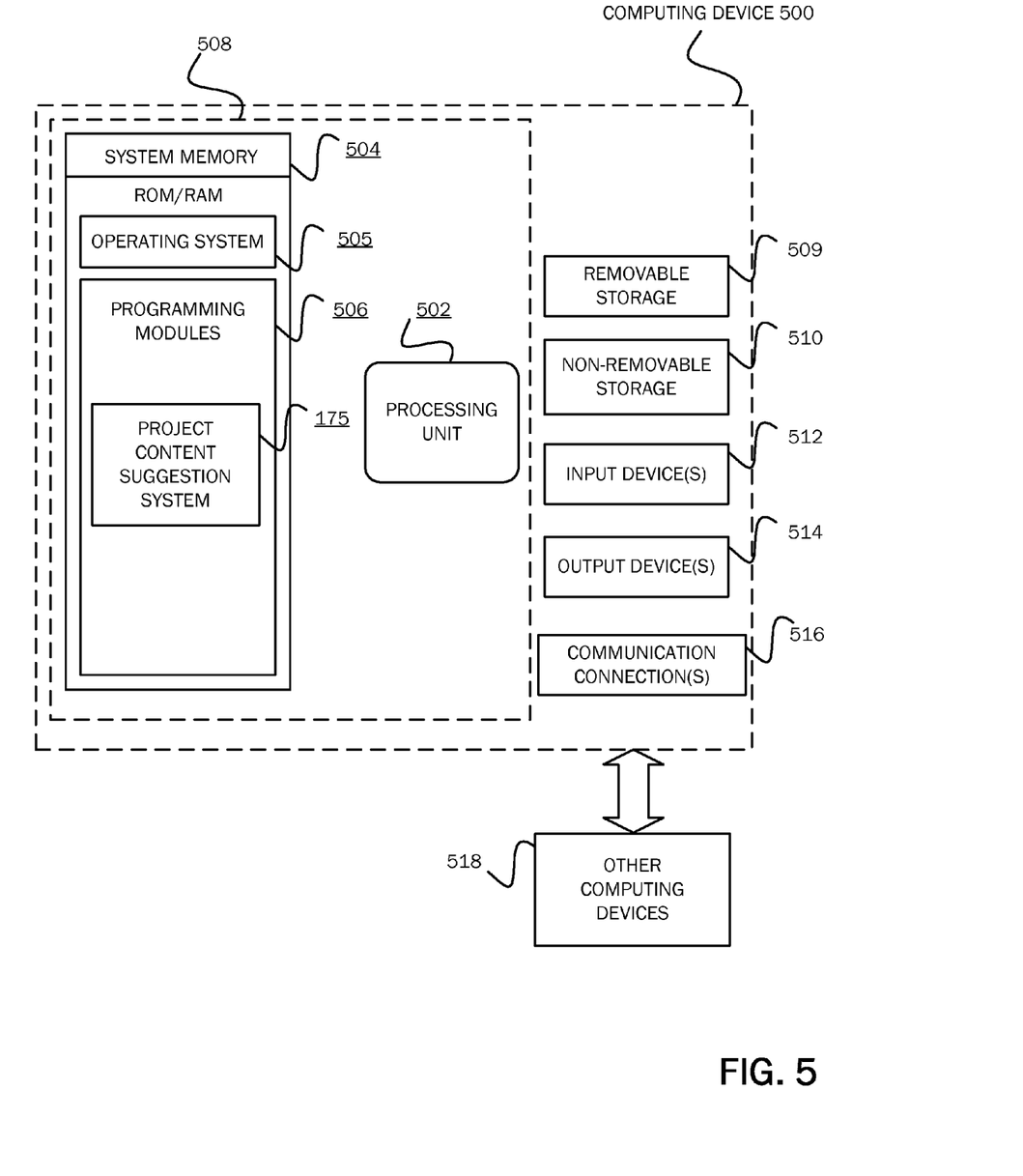
FIG. 5 is a block diagram of a system including a computing device with which embodiments of the invention may be practiced.

With reference to FIG. 5, a system consistent with embodiments of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include the conversation topic detection, generation and storage system 200 having sufficient computer-executable instructions, which when executed, performs functionalities as described herein. Operating system 505, for example, may be suitable for controlling computing device 500's operation. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computing device 500 may also contain a communication connection 516 that may allow device 500 to communicate with other computing devices 518, such as over a network in a distributed computing environment, for example, an intranet or the Internet. Communication connection 516 is one example of communication media.

As stated above, a number of program modules and data files may be stored in system memory 504, including operating system 505. While executing on processing unit 502, programming modules 506 and may include the automatic project content suggestion system 175 which may be program modules containing sufficient computer-executable instructions, which when executed, performs functionalities as described herein. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method of automatically suggesting content for inclusion in a project workspace, comprising:
   providing the project workspace via a collaborative environment, wherein the project workspace includes a workspace membership and one or more data repositories;
   receiving a first content item for inclusion in the project workspace, the first content item including one of electronic documents, contact information, calendar items and task items;
   parsing the first content item for one or more links stored directly within the first content item, the one or more links citing to linked content items included in the project workspace, the linked content items including one or more of linked electronic documents, linked contact information, linked calendar items and linked task items;
   utilizing one or more keywords and associated metadata items from the first content item for searching one or more repositories for additional content items to be suggested for inclusion in the project workspace, the additional content items including one or more of additional electronic documents, additional contact information, additional calendar items and additional task items; and
   suggesting the linked content items and the additional content items to a user for receiving user feedback on whether one or more of the linked content items content items or one or more of the additional content items should be included in the project workspace.

2. The method of claim 1, wherein suggesting the linked content items to the user includes presenting the suggested linked content items to the user via a computer-generated user interface component for acceptance by the user of one or more of the suggested linked content items for inclusion in the project workspace.

3. The method of claim 2, wherein if the user accepts one or more of the suggested linked content items, associating content items associated with the accepted one or more suggested linked content items with the project workspace.

4. The method of claim 3, wherein associating the content items associated with the accepted one or more suggested linked content items with the project workspace includes storing the accepted one or more suggested linked content items in the project workspace.

5. The method of claim 3, wherein if the user does not accept one or more of the suggested linked content items, receiving a correction to one or more of the suggested linked content items, and associating content items associated with the corrected one or more suggested linked content items with the project workspace.

6. The method of claim 3, wherein if the user does not accept one or more of the suggested linked content items, receiving a replacement link to one or more of the suggested linked content items, and associating content items associated with the replacement link with the project workspace.

7. The method of claim 1, prior to receiving a first content item for inclusion in the project workspace, further comprising receiving an identification of the project workspace, and receiving an identification of one or more repositories from which content items are suggested for inclusion in the project workspace.

8. The method of claim 1, prior to suggesting links to the linked content items and the additional content items to a user, merging the linked content items and the additional content items for suggestion to the user as a set of content items.

9. The method of claim 8, after merging the linked content items and links to the additional content items for suggestion to the user as a set of content items, ranking one or more content items contained in the set, and wherein suggesting the linked content items and the additional content items to a user includes suggesting one or more highly ranked content items from the set to the user.

10. A method of automatically suggesting contact items for inclusion in a project workspace, comprising:
   providing the project workspace via a collaborative environment, wherein the project workspace includes a workspace membership and one or more data repositories;
   receiving one or more content items from the project workspace, the first content item including one of electronic documents, contact information, calendar items and task items;
   parsing the one or more content items from the project workspace for one or more links stored directly within the first content item, the one or more links citing to linked content items to be included in the project workspace, the linked content items including one or more of linked electronic documents, linked contact information, linked calendar items and linked task items;
   parsing the one or more content items from the project workspace for one or more keywords that are associated with one or more contact items;
   searching one or more data repositories for the one or more contact items associated with the one or more keywords and for additional content items to be suggested, for inclusion in the project workspace, the additional content items including one or more of additional electronic documents, additional contact information, additional calendar items and additional task items; and
   presenting the linked content items, the additional content items and the one or more contact items to a user via a computer-generated user interface for receiving user feedback on whether the presented linked content items, additional content items and the one or more contact items should be included in the project workspace.

11. The method of claim 10, further comprising:
   receiving one or more linked content items interacted with by one or more users who are members of the project workspace;
   extracting identification information from the one or more linked content items about one or more persons for whom contact items are to be suggested for inclusion in the project workspace;
   searching one or more data repositories for the one or more additional contact items associated with the extracted identification information; and
   presenting the one or more additional contact items to the user via the computer-generated user interface for receiving user feedback on whether the presented one or more additional contact items should be included in the project workspace.

12. The method of claim 11, wherein if the user accepts one or more of the contact items or one or more of the additional contact items, storing the accepted one or more contact items or one or more additional contact items in the project workspace.

13. The method of claim 12, wherein if the user does not accept one or more of the contact items or one or more of the additional contact items, receiving a correction to one or more of the contact items or one or more of the additional contact items, and storing the corrected one or more contact items in the project workspace.

14. The method of claim 12, wherein if the user does not accept one or more of the contact items or one or more of the additional contact items, receiving a replacement to one or more of the contact items or one or more of the additional contact items, and storing the replacement in the project workspace.

15. A computer readable storage device having computer executable instructions which when executed by a computer perform a method of automatically suggesting content for inclusion in a project workspace, comprising:
   receiving an identification of the project workspace, and receiving an identification of one or more repositories from which content items are suggested for inclusion in the project workspace, wherein the project workspace includes a workspace membership and the one or more repositories including one or more of project descriptions, documents, electronic mail messages, contact items, proposed membership users, task items, calendar items;
   receiving a first content item for inclusion in the project workspace, the first content item including one of a document, a content item, a task item or a project description;
   parsing the first content item for one or more links stored directly within the first content item, the one or more links citing to linked content items to be suggested for inclusion in the project workspace, the one or more links including a uniform resource locator or an embedded application component, the linked content items including one or more of linked electronic documents, linked contact information, linked calendar items and linked task items;
   breaking the first content item into one or more keywords and associated metadata, and utilizing the one or more keywords and associated metadata for searching one or more repositories for additional content items to be included in the project workspace, the additional content items including one or more of additional electronic documents, additional contact information, additional calendar items and additional task items; and
   presenting suggested links to the linked content items and to the additional content items to the user via a computer-generated user interface component for acceptance by the user of one or more of the suggested links for inclusion in the project workspace.

16. The computer readable storage device of claim 15, wherein if the user accepts one or more of the suggested links, associating content items associated with the accepted one or more suggested links with the project workspace.

17. The computer readable storage device of claim 15, wherein if the user does not accept one or more of the suggested links, receiving a correction to one or more of the suggested links, and associating content items associated with the corrected one or more suggested links with the project workspace.

18. The computer readable storage device of claim 15, wherein if the user does not accept one or more of the suggested links, receiving a replacement link to one or more of the suggested links, and associating content items associated with the replacement link with the project workspace.

19. The computer readable storage device of claim 15, prior to presenting the suggested links to the linked content items and to the additional content items to the user, further comprising:

- Merging the links to the linked content items and the links to the additional content items for suggestion to the user as a set of links;
- after merging the links to the linked content items and the links to the additional content items for suggestion to the user as the set of links, ranking one or more links contained in the set of links, and wherein presenting the suggested links to the linked content items and to the additional content items to a user includes suggesting one or more highly ranked links from the set of links to the user.

20. The computer readable storage device of claim 15, wherein the one or more links further include an alphanumeric string following a known pattern.

\* \* \* \* \*